United States Patent
Gudapati et al.

(10) Patent No.: US 12,005,911 B2
(45) Date of Patent: Jun. 11, 2024

(54) ROBUST TECHNIQUES FOR MANAGING PRIMARY AND SECONDARY CONTROLLERS ON CAN-FD NETWORKS

(71) Applicants: Abhilash Gudapati, Troy, MI (US); Varun Pradeepkumar Khemchandani, Royal Oak, MI (US); Riley P McGee, Clawson, MI (US)

(72) Inventors: Abhilash Gudapati, Troy, MI (US); Varun Pradeepkumar Khemchandani, Royal Oak, MI (US); Riley P McGee, Clawson, MI (US)

(73) Assignee: FCA US LLC, Auburn Hills, MI (US)

( * ) Notice: Subject to any disclaimer, the term of this patent is extended or adjusted under 35 U.S.C. 154(b) by 151 days.

(21) Appl. No.: 17/872,284

(22) Filed: Jul. 25, 2022

(65) Prior Publication Data

US 2024/0025427 A1    Jan. 25, 2024

(51) Int. Cl.
| | | |
|---|---|---|
| *B60W 50/06* | (2006.01) | |
| *B60L 15/20* | (2006.01) | |
| *B60R 16/023* | (2006.01) | |
| *B60W 50/035* | (2012.01) | |
| *B60W 60/00* | (2020.01) | |

(52) U.S. Cl.
CPC ............ *B60W 50/06* (2013.01); *B60L 15/20* (2013.01); *B60R 16/0231* (2013.01); *B60W 50/035* (2013.01); *B60W 60/001* (2020.02); *B60W 2510/244* (2013.01)

(58) Field of Classification Search
CPC .. B60W 50/06; B60W 50/035; B60W 60/001; B60W 2510/244; B60L 15/20; B60R 16/0231
See application file for complete search history.

(56) References Cited

U.S. PATENT DOCUMENTS

| | | | |
|---|---|---|---|
| 10,678,726 B2 | 6/2020 | Rennig et al. | |
| 11,308,003 B2 * | 4/2022 | Yamada | .................. G06F 7/588 |
| 11,366,778 B2 * | 6/2022 | Rennig | ................. H04L 12/403 |
| 11,526,458 B2 * | 12/2022 | Rennig | ................. H04L 7/0016 |

(Continued)

FOREIGN PATENT DOCUMENTS

CN        106184070 B      6/2018

*Primary Examiner* — Richard M Camby

(74) *Attorney, Agent, or Firm* — Jeremy J. Klobucar

(57) ABSTRACT

Primary/secondary controller management techniques for a network include determining, by a secondary controller of a set of secondary controllers on the network, a set of housekeeping activities/tasks to be completed before shutdown of the secondary controller, communicating, by the secondary controller with a primary controller on the network, to keep the primary controller awake until the secondary controller completes the set of housekeeping activities/tasks, wherein the primary controller is configured to control and/or supervise the set of secondary controllers on the network, completing, by the secondary controller, the set of housekeeping activities/tasks irrespective of a shutdown command received from the primary controller, and upon completing the set of housekeeping activities/tasks, communicating, by the secondary controller with the primary controller, such that the primary controller shuts down and then independently shutting down itself to mitigate or eliminate errors/malfunctions due to any incomplete housekeeping tasks/activities.

18 Claims, 3 Drawing Sheets

(56) References Cited

U.S. PATENT DOCUMENTS

| | | | |
|---|---|---|---|
| 11,575,404 B2* | 2/2023 | Maggio | H04L 25/4906 |
| 2005/0210179 A1* | 9/2005 | Walmsley | G06F 21/445 |
| | | | 711/3 |
| 2010/0309689 A1* | 12/2010 | Coulson | H02M 3/33507 |
| | | | 363/16 |
| 2012/0083902 A1 | 4/2012 | Daum et al. | |

* cited by examiner

ROBUST TECHNIQUES FOR MANAGING PRIMARY AND SECONDARY CONTROLLERS ON CAN-FD NETWORKS

FIELD

The present application generally relates to vehicle controller area networks (CANs) and, more particularly, to robust techniques for managing primary and secondary controllers on CAN Flexible Data-Rate (CAN-FD) networks.

BACKGROUND

Today's vehicle control systems and controller area networks (CANs) are increasingly complex having a plurality of primary controllers each with its own set of secondary controllers. Non-limiting examples of a primary controller and secondary controllers are a primary engine control module (ECM) and secondary valve/pump control modules. Conventional primary/secondary controller communication is asymmetric in that a primary controller controls when its respective secondary controllers wake up or shut down. In some cases, a secondary controller could have activities/tasks remaining to perform, irrespective of a status of its primary controller (e.g., which could send a shutdown command). This inadvertent shutdown while activities/tasks remain could result in errors/malfunctions. Accordingly, while such conventional primary and secondary controller management in traditional CANs do work for their intended purpose, there exists an opportunity for improvement in the relevant art.

SUMMARY

According to one example aspect of the invention, a primary/secondary controller management system for a network is presented. In one exemplary implementation, the primary/secondary controller management system comprises a primary controller on the network, the primary controller being configured to control and/or supervise a set of secondary controllers on the network, a secondary controller of the set of secondary controllers also on the network that is controlled and/or supervised by the primary controller, wherein the secondary controller is further configured to determine a set of housekeeping activities/tasks to be completed before shutdown of the secondary controller, communicate with the primary controller to keep the primary controller awake until the secondary controller completes the set of housekeeping activities/tasks, complete the set of housekeeping activities/tasks irrespective of a shutdown command received from the primary controller, and upon completing the set of housekeeping activities/tasks, communicate with the primary controller such that the primary controller shuts down and then independently shutting down itself, wherein the primary/secondary controller management system is able to mitigate or eliminate errors/malfunctions due to any incomplete housekeeping tasks/activities by keeping itself and the primary controller temporarily awake.

In some implementations, the network is a controller area network flexible data-rate (CAN-FD) network of a vehicle. In some implementations, the vehicle is an electrified vehicle (EV) and the primary controller is a hybrid control processor (HCP) and the secondary controller is an auxiliary HCP, and wherein the HCP and the auxiliary HCP are both part of a power inverter module (PIM). In some implementations, the HCP and the auxiliary HCP are connected to different primary CAN buses FD-CAN3 and FD-CAN14, respectively, of the CAN-FD network. In some implementations, the primary CAN buses FD-CAN3 and FD-CAN14 are utilized to communicate wake-up and shutdown commands to the HCP and the auxiliary HCP. In some implementations, the HCP and the auxiliary HCP are both connected to a same secondary CAN bus FD-CAN11 on the CAN-FD network. In some implementations, the auxiliary HCP is connected to an integrated dual charging module (IDCM) and a battery pack control module (BPCM) via CAN bus FC-CAN11, and wherein the set of housekeeping activities/tasks relate to charging the EV as desired. In some implementations, the vehicle is equipped with advanced driver assistance systems (ADAS) and/or autonomous driving functionality. In some implementations, the CAN-FD network has an Atlantis High architecture.

According to another example aspect of the present invention, a primary/secondary controller management method for a network is presented. In one exemplary implementation, the primary/secondary controller management method comprises providing a primary controller on the network, the primary controller being configured to control and/or supervise a set of secondary controllers on the network, providing a secondary controller of the set of secondary controllers also on the network and controlled and/or supervised by the primary controller, determining, by the secondary controller, a set of housekeeping activities/tasks to be completed before shutdown of the secondary controller, communicating, by the secondary controller with the primary controller, to keep the primary controller awake until the secondary controller completes the set of housekeeping activities/tasks, completing, by the secondary controller, the set of housekeeping activities/tasks irrespective of a shutdown command received from the primary controller, and upon completing the set of housekeeping activities/tasks, communicating, by the secondary controller with the primary controller, such that the primary controller shuts down and then independently shutting down itself, wherein the secondary controller is able to mitigate or eliminate errors/malfunctions due to any incomplete housekeeping tasks/activities by keeping itself and the primary controller temporarily awake.

In some implementations, the network is a CAN-FD network of a vehicle. In some implementations, the vehicle is an EV and the primary controller is an HCP and the secondary controller is an auxiliary HCP, and wherein the HCP and the auxiliary HCP are both part of a PIM. In some implementations, the HCP and the auxiliary HCP are connected to different primary CAN buses FD-CAN3 and FD-CAN14, respectively, of the CAN-FD network. In some implementations, the primary CAN buses FD-CAN3 and FD-CAN14 are utilized to communicate wake-up and shutdown commands to the HCP and the auxiliary HCP. In some implementations, the HCP and the auxiliary HCP are both connected to a same secondary CAN bus FD-CAN11 on the CAN-FD network. In some implementations, the auxiliary HCP is connected to an IDCM and a BPCM via CAN bus FC-CAN11, and wherein the set of housekeeping activities/tasks relate to charging the EV as desired. In some implementations, the vehicle is equipped with ADAS and/or autonomous driving functionality. In some implementations, the CAN-FD network has an Atlantis High architecture.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, a secondary controller could have activities/tasks remaining to perform, irrespective of a status of its primary controller (e.g., which could send a shutdown command). This inadvertent shutdown while activities/tasks remain could result in errors/malfunctions. Accordingly, while such conventional primary and secondary controller management in traditional controller area networks (CANs) do work for their intended purpose, there exists an opportunity for improvement in the relevant art. Accordingly, improved (more robust) techniques are presented allow secondary controllers to remain awake (irrespective of shutdown commands from their primary controller) as well as keeping the primary controller awake until the remaining activities/tasks (e.g., housekeeping) are complete, after which the secondary controllers can independently shutdown followed by the primary controller. This could also be described as two-way, or symmetric primary/secondary controller communication. CAN flexible data-rate (CAN-FD) is a newer protocol for high performance vehicle communication. CAN-FD networks are capable of much higher speeds and data throughput, which is particularly important on complex networks for electrified vehicles (EVs) having a plurality of primary/secondary controllers and advanced driver assistance system (ADAS) and autonomous driving functionality.

Some CAN-FD networks are also already equipped for such two-way or symmetric primary/secondary controller communication (e.g., hard-wiring). One particular CAN-FD architecture, also known as "Atlantis" or "Atlantis High," was developed by Original Equipment Manufacturer (OEM) assignee of the subject application, which replaces the previous generation's Powernet architecture as the current and future in-vehicle communication protocol. One potential benefit is the increased speed/throughput of CAN-FD networks (e.g., five times or more faster than conventional CAN networks) while mitigating or eliminating the above-described errors/malfunctions.

Additionally, because these hardwire connections already exist as part of the CAN-FD network, complex additional wiring and/or network architecture redesign are not required. The result is a software-only based solution that provides for the requisite functionality without additional costs. While the systems and methods of the present application are described with reference to CAN-FD networks for vehicles, it will be appreciated that these software-only based solutions could be applicable to any suitably configured primary/secondary controller management system/method for any suitably configured network.

Figure 1:
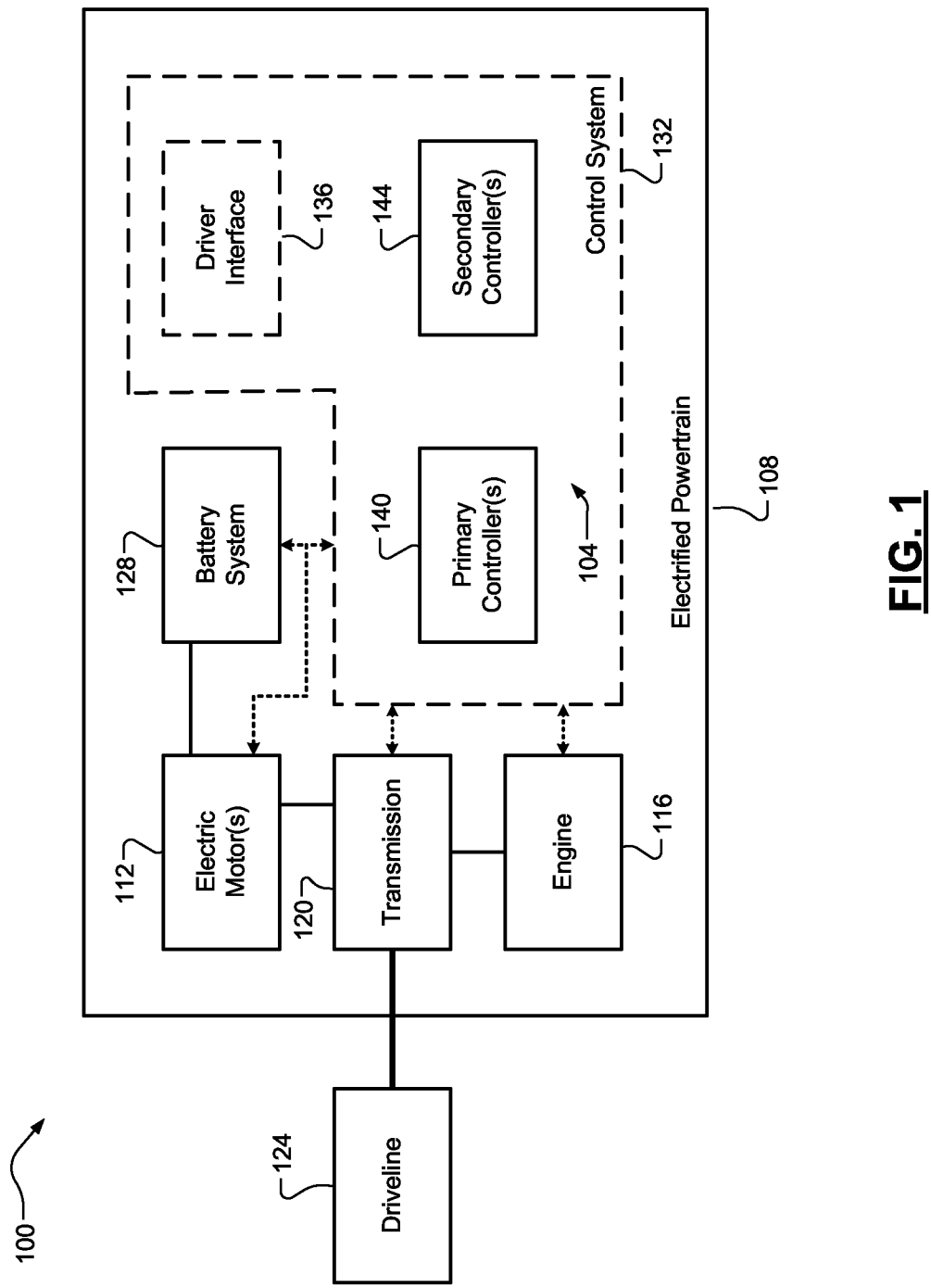
FIG. 1 is a functional block diagram of an electrified vehicle (EV) having a controller area network flexible data-rate (CAN-FD) network according to the principles of the present application.

Referring now to FIG. 1, a functional block diagram of an example EV 100 having a CAN-FD network 104 according to the principles of the present application is illustrated. While an EV-type vehicle is shown and described herein, it will be appreciated that the primary/secondary controller management techniques of the present disclosure could be applicable to any suitable vehicle having an appropriately-configured CAN-FD network. The EV 100 generally comprises an electrified powertrain 108 having one or more electric motors 112 and an optional engine 116. The electrified powertrain 108 generates and transfers drive torque via a transmission 120 to a driveline 124 for propulsion. More specifically, the electric motor(s) 112 convert electrical energy (current) from a battery system 128 to rotational kinetic energy and the optional engine 116 combusts a fuel/air mixture to generate rotational kinetic energy at a crankshaft (not shown).

The EV 100 is generally controlled by a control system 132 that, among other functions, controls the electrified powertrain 108 to generate a desired amount of drive torque based on a driver torque request (e.g., via a driver interface 136). As generally shown, the control system 132 includes primary controller(s) 140, secondary controller(s) 144, and the driver interface 136, all interconnected on the CAN-FD network 104. It will be appreciated that the EV 100 could include many other non-illustrated components, such as, but not limited to, brake systems, advanced driver assistance systems (ADAS) or autonomous driving systems, plug-in charging systems (an integrated dual charging module (IDCM), a battery pack control module (BPCM), etc.), which will now be discussed in greater detail with reference to a specific (Atlantis High) CAN-FD network architecture.

Figure 2:
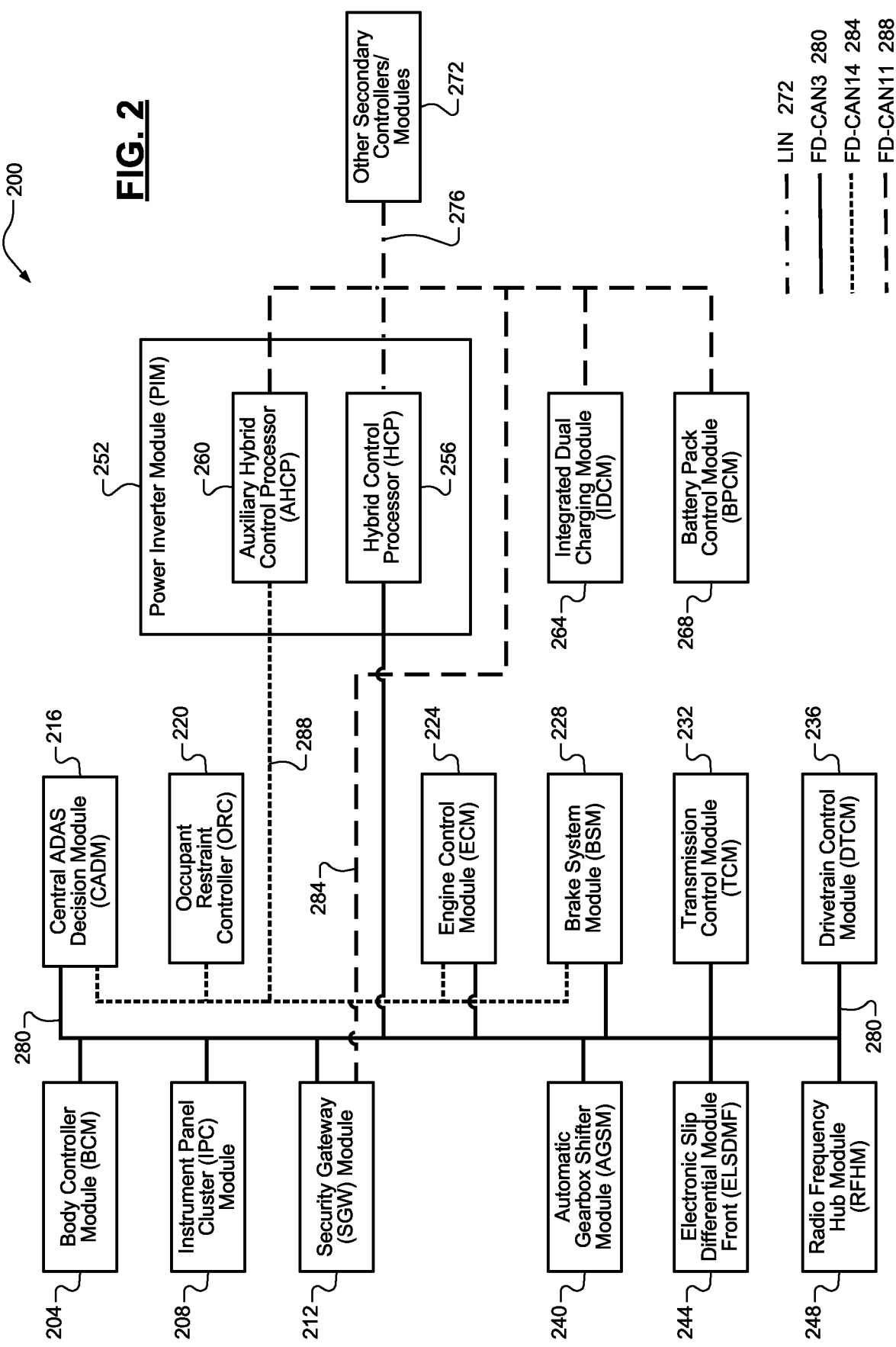
FIG. 2 is a functional block diagram of an example CAN-FD network (Atlantis High) architecture according to the principles of the present application.

Referring now to FIG. 2 and with continued reference to FIG. 1, a functional block diagram of an example architecture (also referred to as "Atlantis High") for a CAD-FD network 200 according to the principles of the present application is illustrated. It will be appreciated that, for simplicity and understanding, not every component of the CAD-FD network 200 will be illustrated and discussed herein (i.e., there can be and likely are additional components). The CAN-FD network 200 generally comprises the following primary controller/modules: (1) a body controller module (BCM) 204; (2) an instrument panel cluster (IPC) module 208; (3) a security gateway (SGW) module 212; (4) a central ADAS decision module (CADM) 216; (5) an occupant restraint controller (ORC) 220; (6) an engine control module (ECM) 224; (7) a brake system module (BSM) 228; (8) a transmission control module (TCM) 232; (8) a drivetrain control module (DTCM) 244); (10) an automatic gearbox shifter module (AGSM) 224; (11) an electronic slip differential module front (ELSDMF) 240; and (12) a radio frequency hub module (RHFM) 248.

A power inverter module (PIM) 252 also includes one of the primary controllers/modules—a hybrid control processor (HCP) 256. The CAN-FD network 200 also includes a plurality of secondary controllers/modules. These secondary controllers/modules include, for example: (1) an auxiliary HCP (AHCP) 260 that is also part of the PIM 252; (2) an IDCM 264; (3) a BPCM 268, and other electrified powertrain (e-PT) secondary controllers 272 connected to the HCP 256 via a separate Local Interconnect Network (LIN) bus 276.

The various primary and secondary controllers/modules listed above and shown in FIG. 2 are each connected to one or more of three FD-CAN buses: (1) an FD-CAN3 bus 280, (2) an FD-CAN14 bus 284, and (3) an FD-CAN11 bus 288. As can be seen, the FD-CAN3 bus 280 primarily operates to command wakeup/shutdown based on key-on/key-off commands or requested. The HCP 256, as well as the AHCP 260, are also connected to the IDCM 264 and the BPCM via the FD-CAN11 bus 288. In addition, the AHCP 260 is also connected to CADM 216, the ORC 220, the ECM 224, and the BSM 228 via the FD-CAN14 bus 284.

Thus, the FD-CAN14 and FD-CAN11 buses 284, 288 are utilizable for the software-only based techniques of the present application (i.e., overriding shutdown commands via the FD-CAN3 bus 280 until all housekeeping activities/tasks are completed). Some primary examples of these housekeeping activities/tasks include charging of the EV 100 to (the battery system 128) a desired level (e.g., the ECM 224, the IDCM 264, and the BPCM 268), safety protocols (e.g., the CADM 216, and ORC 220, and the BSM 228), and the like. It will be appreciated, however, that any suitable housekeeping activities/tasks could be required to be performed prior to total shutdown of the EV 100 and the CAN-FD 104.

Figure 3:
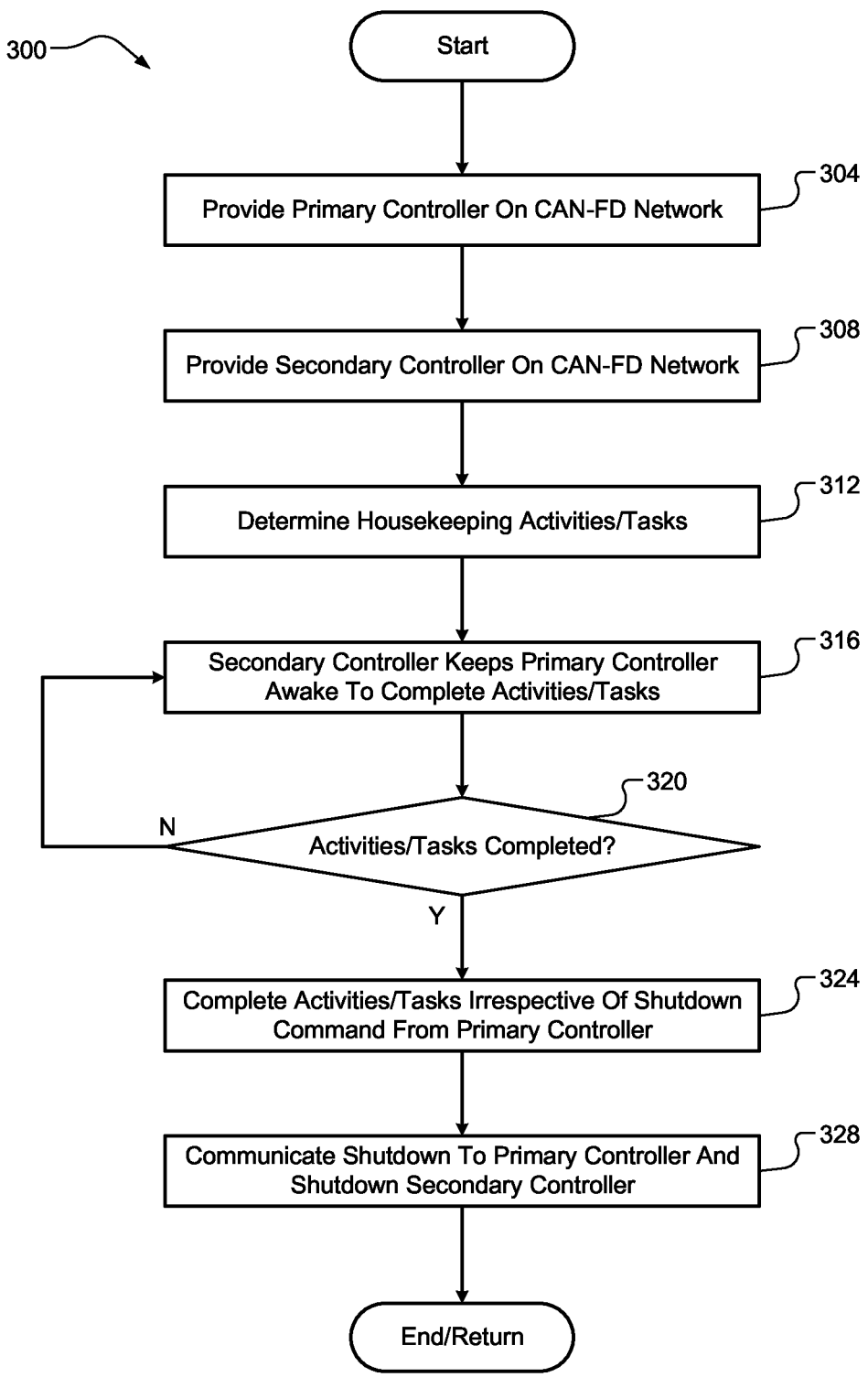
FIG. 3 is a flow diagram of an example primary/secondary controller control method for a vehicle having a CAN-FD network according to the principles of the present application.

Referring now to FIG. 3, a flow diagram of an example primary/secondary controller management method 300 for a vehicle having a CAN-FD network according to the principles of the present application is illustrated. As previously discussed herein, this method 300 is described generically for any primary/secondary controllers having an appropriately-configured CAN-FD network, such as the EV 100 and CAN-FD network 104 as previously described and illustrated herein. At 304, a primary controller on the CAN-FD network is provided, the primary controller being configured to control and/or supervise a set of secondary controllers on the CAN-FD network. At 308, a secondary controller of the set of secondary controllers is also provided on the CAN-FD network and controlled and/or supervised by the primary controller. At 312, the secondary controller determines a set of housekeeping activities/tasks to be completed before shutdown of the secondary controller. At 316, the secondary controller communicates with the primary controller to keep the primary controller awake until the secondary controller completes the set of housekeeping activities/tasks. At 320, the secondary controller determines whether the set of housekeeping activities/tasks are completed. When true, the method 300 proceeds to 324. Otherwise, the method 300 returns to 316.

At 324, the secondary controller completes the set of housekeeping activities/tasks irrespective of a shutdown command received from the primary controller. At 328, upon completing the set of housekeeping activities/tasks, the secondary controller communicates with the primary controller such that the primary controller shuts down and then independently shutting down itself (the secondary controller). This method 300 potentially provides for the mitigation or elimination of errors/malfunctions due to any incomplete housekeeping tasks/activities by keeping the secondary controller and the primary controller temporarily awake. The method 300 then ends or returns to 304 for one or more additional cycles (e.g., after a subsequent shutdown and wake-up, such as in response to a key-on command/request).

It will be appreciated that the terms "controller," "unit," "module," and the like as used herein refers to any suitable control device or set of multiple control devices that is/are configured to perform at least a portion of the techniques of the present application. It will also be appreciated that the terms "primary" and "secondary" with respect to controllers and the like are used to reference their programmed hierarchy functionality and should not be construed as limiting (e.g., a secondary controller could be more complex or powerful than or equivalent to its respective primary controller). Non-limiting examples of controllers/units/modules include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A primary/secondary controller management system for a network, the primary/secondary controller management system comprising:
    a primary controller on the network, the primary controller being configured to control and/or supervise a set of secondary controllers on the network;
    a secondary controller of the set of secondary controllers also on the network that is controlled and/or supervised by the primary controller, wherein the secondary controller is further configured to:
        determine a set of housekeeping activities/tasks to be completed before shutdown of the secondary controller;
        communicate with the primary controller to keep the primary controller awake until the secondary controller completes the set of housekeeping activities/tasks;
        complete the set of housekeeping activities/tasks irrespective of a shutdown command received from the primary controller; and
        upon completing the set of housekeeping activities/tasks, communicate with the primary controller such that the primary controller shuts down and then independently shutting down itself,
    wherein the primary/secondary controller management system is able to mitigate or eliminate errors/malfunctions due to any incomplete housekeeping tasks/activities by keeping itself and the primary controller temporarily awake.

2. The primary/secondary controller management system of claim 1, wherein the network is a controller area network flexible data-rate (CAN-FD) network of a vehicle.

3. The primary/secondary controller management system of claim 2, wherein the vehicle is an electrified vehicle (EV) and the primary controller is a hybrid control processor (HCP) and the secondary controller is an auxiliary HCP, and wherein the HCP and the auxiliary HCP are both part of a power inverter module (PIM).

4. The primary/secondary controller management system of claim 3, wherein the HCP and the auxiliary HCP are connected to different primary CAN buses FD-CAN3 and FD-CAN14, respectively, of the CAN-FD network.

5. The primary/secondary controller management system of claim 4, wherein the primary CAN buses FD-CAN3 and FD-CAN14 are utilized to communicate wake-up and shutdown commands to the HCP and the auxiliary HCP.

6. The primary/secondary controller management system of claim 4, wherein the HCP and the auxiliary HCP are both connected to a same secondary CAN bus FD-CAN11 on the CAN-FD network.

7. The primary/secondary controller management system of claim 6, wherein the auxiliary HCP is connected to an integrated dual charging module (IDCM) and a battery pack control module (BPCM) via CAN bus FC-CAN11, and wherein the set of housekeeping activities/tasks relate to charging the EV as desired.

8. The primary/secondary controller management system of claim 2, wherein the vehicle is equipped with advanced driver assistance systems (ADAS) and/or autonomous driving functionality.

9. The primary/secondary controller management system of claim 2, wherein the CAN-FD network has an Atlantis High architecture.

10. A primary/secondary controller management method for a network, the primary/secondary controller management method comprising:
providing a primary controller on the network, the primary controller being configured to control and/or supervise a set of secondary controllers on the network;
providing a secondary controller of the set of secondary controllers also on the network and controlled and/or supervised by the primary controller;
determining, by the secondary controller, a set of housekeeping activities/tasks to be completed before shutdown of the secondary controller;
communicating, by the secondary controller with the primary controller, to keep the primary controller awake until the secondary controller completes the set of housekeeping activities/tasks;
completing, by the secondary controller, the set of housekeeping activities/tasks irrespective of a shutdown command received from the primary controller; and
upon completing the set of housekeeping activities/tasks, communicating, by the secondary controller with the primary controller, such that the primary controller shuts down and then independently shutting down itself,
wherein the secondary controller is able to mitigate or eliminate errors/malfunctions due to any incomplete housekeeping tasks/activities by keeping itself and the primary controller temporarily awake.

11. The primary/secondary controller management method of claim 10, wherein the network is a controller area network flexible-data rate (CAN-FD) network of a vehicle.

12. The primary/secondary controller management method of claim 11, wherein the vehicle is an electrified vehicle (EV) and the primary controller is a hybrid control processor (HCP) and the secondary controller is an auxiliary HCP, and wherein the HCP and the auxiliary HCP are both part of a power inverter module (PIM).

13. The primary/secondary controller management method of claim 12, wherein the HCP and the auxiliary HCP are connected to different primary CAN buses FD-CAN3 and FD-CAN14, respectively, of the CAN-FD network.

14. The primary/secondary controller management method of claim 13, wherein the primary CAN buses FD-CAN3 and FD-CAN14 are utilized to communicate wake-up and shutdown commands to the HCP and the auxiliary HCP.

15. The primary/secondary controller management method of claim 13, wherein the HCP and the auxiliary HCP are both connected to a same secondary CAN bus FD-CAN11 on the CAN-FD network.

16. The primary/secondary controller management method of claim 15, wherein the auxiliary HCP is connected to an integrated dual charging module (IDCM) and a battery pack control module (BPCM) via CAN bus FC-CAN11, and wherein the set of housekeeping activities/tasks relate to charging the EV as desired.

17. The primary/secondary controller management method of claim 11, wherein the vehicle is equipped with advanced driver assistance systems (ADAS) and/or autonomous driving functionality.

18. The primary/secondary controller management method of claim 11, wherein the CAN-FD network has an Atlantis High architecture.

* * * * *